United States Patent
Choi et al.

(10) Patent No.: US 8,184,235 B2
(45) Date of Patent: May 22, 2012

(54) OPTICAL PRISM SHEET, BACKLIGHT UNIT, AND LIQUID CRYSTAL DISPLAY

(75) Inventors: Jun Hyeak Choi, Uiwang-si (KR); Man Suk Kim, Uiwang-si (KR); Hyun Joo Cho, Uiwang-si (KR); Ju Yeol Choi, Uiwang-si (KR); Seok Hoon Jang, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 12/585,903

(22) Filed: Sep. 28, 2009

(65) Prior Publication Data
US 2010/0134720 A1    Jun. 3, 2010

Related U.S. Application Data

(63) Continuation of application No. PCT/KR2008/001718, filed on Mar. 27, 2008.

(30) Foreign Application Priority Data

Mar. 28, 2007   (KR) .................. 10-2007-0030385

(51) Int. Cl.
  *G02F 1/1335* (2006.01)
  *F21V 7/04* (2006.01)

(52) U.S. Cl. .................. 349/62; 349/64; 362/620
(58) Field of Classification Search .................. 349/62, 349/64, 66; 362/620
See application file for complete search history.

(56) References Cited

U.S. PATENT DOCUMENTS

| | | | |
|---|---|---|---|
| 5,914,825 A * | 6/1999 | Nishio et al. | 359/851 |
| 6,798,574 B2 | 9/2004 | Kim | |
| 7,622,164 B2 * | 11/2009 | Jones et al. | 428/1.1 |
| 2005/0099815 A1 * | 5/2005 | Kim et al. | 362/339 |
| 2005/0233113 A1 * | 10/2005 | Kotani et al. | 428/141 |
| 2007/0279552 A1 * | 12/2007 | Olczak et al. | 349/95 |

FOREIGN PATENT DOCUMENTS

| | | |
|---|---|---|
| JP | 08-054503 A | 2/1996 |
| JP | 2005-142164 A | 6/2005 |
| KR | 10-2002-0061802 A | 7/2002 |
| KR | 10-2005-0103329 A | 10/2005 |

* cited by examiner

*Primary Examiner* — Nathanael R Briggs
(74) *Attorney, Agent, or Firm* — Lee & Morse, P.C.

(57) ABSTRACT

An optical prism sheet includes an optical refracting part including a plurality of unit prisms, the unit prisms each having a predetermined cross-section and being disposed on one side of the optical prism sheet, and fine irregularities having a predetermined roughness and configured to diffuse light, the fine irregularities being on surfaces of the unit prisms and increasing a unit surface area of the optical refracting part by about 1.1 to about 100 times.

13 Claims, 7 Drawing Sheets

(a)

(b)

(c)

(d)

(a)

(b)

(c)

OPTICAL PRISM SHEET, BACKLIGHT UNIT, AND LIQUID CRYSTAL DISPLAY

CROSS-REFERENCE TO RELATED APPLICATION

This is a continuation application of co-pending PCT Patent Application Serial No. PCT/KR2008/001718, entitled, "Optical Prism Sheet Having a Certain Roughness Thereon," filed on Mar. 27, 2008, the entire contents of which are hereby incorporated by reference.

BACKGROUND OF THE INVENTION

1. Field of the Invention

Embodiments relate to an optical prism sheet, a backlight unit, and a liquid crystal display.

2. Description of the Related Art

The term liquid crystal display (LCD) generally refers to a device that displays numerals, text, images, etc., through application of an electric field to liquid crystals. The liquid crystals may be an intermediate phase material between a liquid and a solid, and may be arranged between two glass substrates acting as electrodes in a liquid crystal display panel, which may include the liquid crystals arranged in a predetermined pattern and may adjust transmittance of light passing therethrough.

The liquid crystal display panel may not be a self-emissive device. Thus, it may be provided with a backlight unit acting as a light source for emitted light. Thus, images in an LCD may be formed by the liquid crystal panel, and visibly displayed using light from the backlight unit.

Recently, techniques for making a LCD of 17 or 19 inches have been applied to large-scale panels of 40 inches or more. For these large-scale panels, it may be beneficial for light emitted from the backlight unit to have a predetermined intensity, and to have uniform diffusion throughout the whole area of the panel.

SUMMARY OF THE INVENTION

Embodiments are directed to an optical prism sheet, a backlight unit, and a liquid crystal display, which substantially overcome one or more problems due to the limitations and disadvantages of the related art.

It is therefore a feature of an embodiment to provide an optical prism sheet having fine irregularities thereon for diffusing light while refracting the light to have a specific orientation.

It is therefore another feature of an embodiment to provide an LCD backlight unit using the optical prism sheet, and an LCD including the same.

At least one of the above and other features and advantages may be realized by providing an optical prism sheet, including an optical refracting part including a plurality of unit prisms, the unit prisms each having a predetermined cross-section and being disposed on one side of the optical prism sheet, and fine irregularities having a predetermined roughness and configured to diffuse light, the fine irregularities being on surfaces of the unit prisms and increasing a unit surface area of the optical refracting part by about 1.1 to about 100 times.

The fine irregularities may increase the unit surface area of the unit prisms about 1.5 to about 20 times.

The fine irregularities may provide the optical refracting part with a mean roughness of about 0.05 µm to about 30 µm.

The fine irregularities may provide the optical refracting part with a mean roughness of about 0.1 µm to about 10 µm.

The unit prisms may have cross-sections that include at least one of a triangular shape, a semicircular shape, a trapezoidal shape, and a rounded wedge shape.

The unit prisms may have a triangular cross-section, and an internal angle at the peak of the triangular cross-section may be about 30° to about 120°.

An outer surface around the peak may be rounded.

The unit prisms may have a height of about 2 µm to about 100 µm.

The unit prisms may have a pitch of about 5 µm to about 300 µm.

The unit prisms may have a pitch of about 10 µm to about 200 µm.

The fine irregularities may provide the optical refracting part with a mean roughness of about 0.05 µm to about 30 µm.

The fine irregularities may provide the optical refracting part with a mean roughness of about 0.1 µm to about 10 µm.

The optical sheet may include a base film, the base film including at least one of a transparent synthetic resin, a glass, and a transparent metal oxide.

The base film may include the transparent synthetic resin, and the transparent synthetic resin may include at least one of polyethylene, polypropylene, polycarbonate, and polymethylmethacrylate (PMMA).

The optical refracting part may be made of a same material as the base film.

The optical refracting part and the fine irregularities may be integrally formed.

At least one of the above and other features and advantages may also be realized by providing a backlight unit, including a light guide plate, a light source providing light to a lateral or rear side of the light guide plate, and an optical prism sheet disposed at a light-exit side of the light guide plate, the optical prism sheet including an optical refracting part including a plurality of unit prisms, the unit prisms each having a predetermined cross-section and being disposed on one side of the optical prism sheet, and fine irregularities having a predetermined roughness and configured to diffuse light, the fine irregularities being on surfaces of the unit prisms and increasing a unit surface area of the optical refracting part by about 1.1 to about 100 times.

At least one of the above and other features and advantages may also be realized by providing a liquid crystal display, including a liquid crystal display panel, a light source, a light guide plate disposed in an optical path between the light source and the liquid crystal display panel, and an optical prism sheet disposed in the optical path between the light guide plate and the liquid crystal display panel, the optical prism sheet including an optical refracting part including a plurality of unit prisms, the unit prisms each having a predetermined cross-section and being disposed on one side of the optical prism sheet, and fine irregularities having a predetermined roughness and configured to diffuse light, the fine irregularities being on surfaces of the unit prisms and increasing a unit surface area of the optical refracting part by about 1.1 to about 100 times.

BRIEF DESCRIPTION OF THE DRAWINGS

The above and other features and advantages will become more apparent to those of skill in the art by describing in detail exemplary embodiments with reference to the attached drawings, in which.

DETAILED DESCRIPTION OF THE INVENTION

Figure 1:
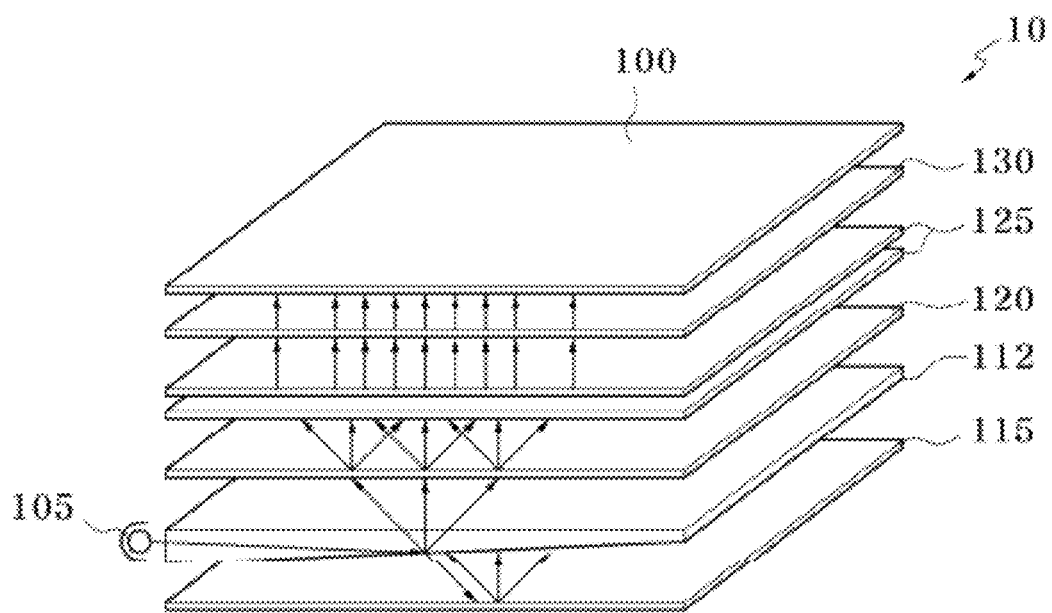
FIG. 1 illustrates an exploded perspective view of a LCD backlight unit having prism sheets and a diffuser sheet.

Korean Patent Application No. 10-2007-0030385, filed on Mar. 28, 2007, in the Korean Intellectual Property Office, and entitled: "Optical Prism Sheet Having a Certain Roughness Thereon," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an exploded perspective view of a liquid crystal display 10, in which a backlight unit has prism sheets 125 and a diffuser sheet 120. The LCD backlight unit 10 may include a light source 105, a light guide plate 112, a reflector plate 115, the diffuser sheet 120, the prism sheets 125, and a protector sheet 130. The light source 105 may emit light to illuminate a liquid crystal display panel ("LCD panel") 100. Various types of light sources 125 may be used, e.g., cold cathode fluorescent lamps (CCFL's), LED's, etc., which may consume very little power and emit very bright white light.

Referring to FIG. 1, the light guide plate 112 may be located at one side of the light source 105 below the LCD panel 100. The light guide plate 112 may project light to a front of the light guide plate 112 after converting a spot light of the light source 105 into plane light. The reflector plate 115 may be located at a rear of the light guide plate 112 and may reflect light emitted from the light source 105 towards the LCD panel 100 positioned in front of the reflector plate.

The diffuser sheet 120 may be located at an upper side of the light guide plate 112 and may provide uniform light from the light that passed through the light guide plate 112. Furthermore, the protector sheet 130 may be disposed on the prism sheets 125, and may protect the prism sheets 125 from damage, e.g., scratches. The protection sheet 130 may also protect against the occurrence of Moire patterns, which may occur when using prism sheets 125 stacked in two layers, e.g., in the horizontal and vertical directions.

Generally, when light is transmitted through, or reflected from, a narrow area, the narrow area appears brighter than other portions. On the other hand, if light of the same intensity is transmitted through and reflected from a wide area, the wide area, while occupying a larger area, may look darker than the narrow area.

The prism sheets 125 may improve brightness by refracting and collecting light that would otherwise tend to undergo a rapid decrease in brightness due to, e.g., diffusion in both directions, i.e., horizontal and vertical directions, while passing through the diffuser sheet 120. As shown in FIG. 1, the prism sheet 125 may refract the light that has been emitted from the light guide plate 112 and diffused through the diffuser sheet 120, so that the light has a specific orientation.

Figure 2:
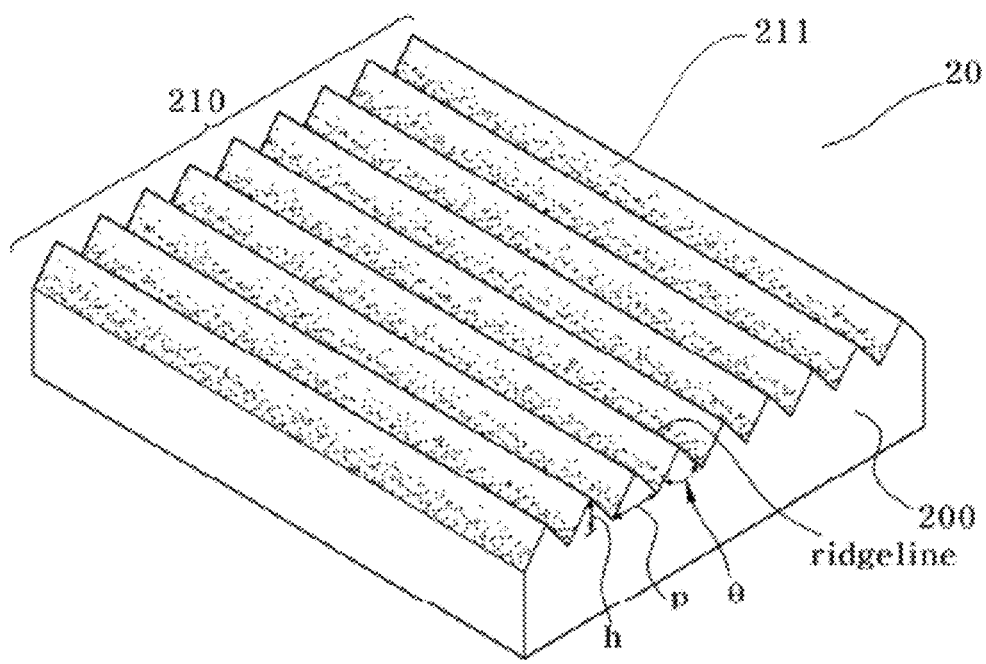
FIG. 2 illustrates a schematic perspective view of an optical sheet according to an embodiment.
Figure 3:
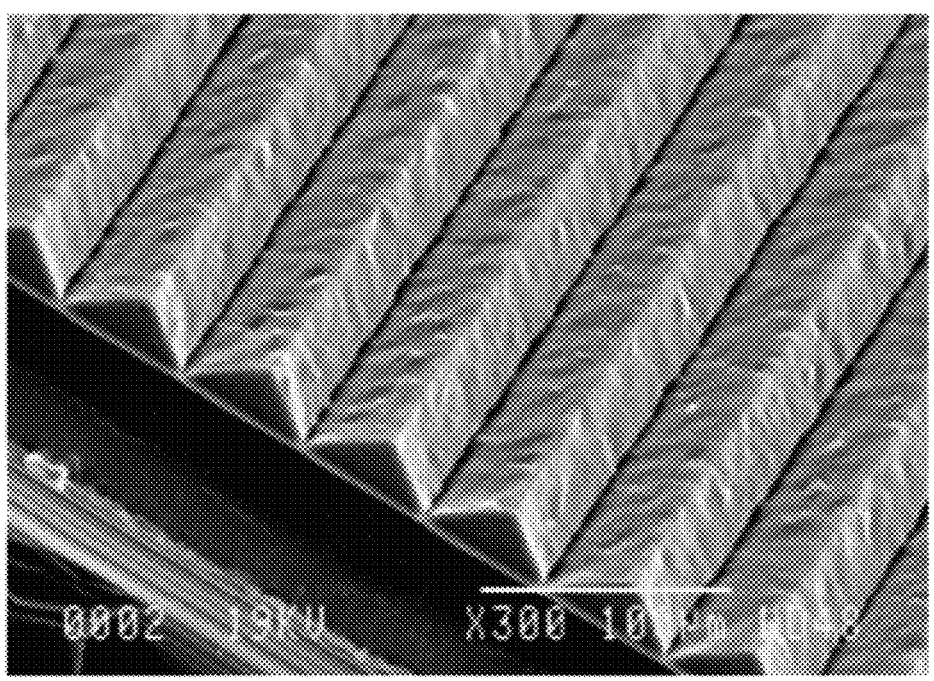
FIG. 3 illustrates an electron micrograph of an optical sheet according to an embodiment.
Figure 4:
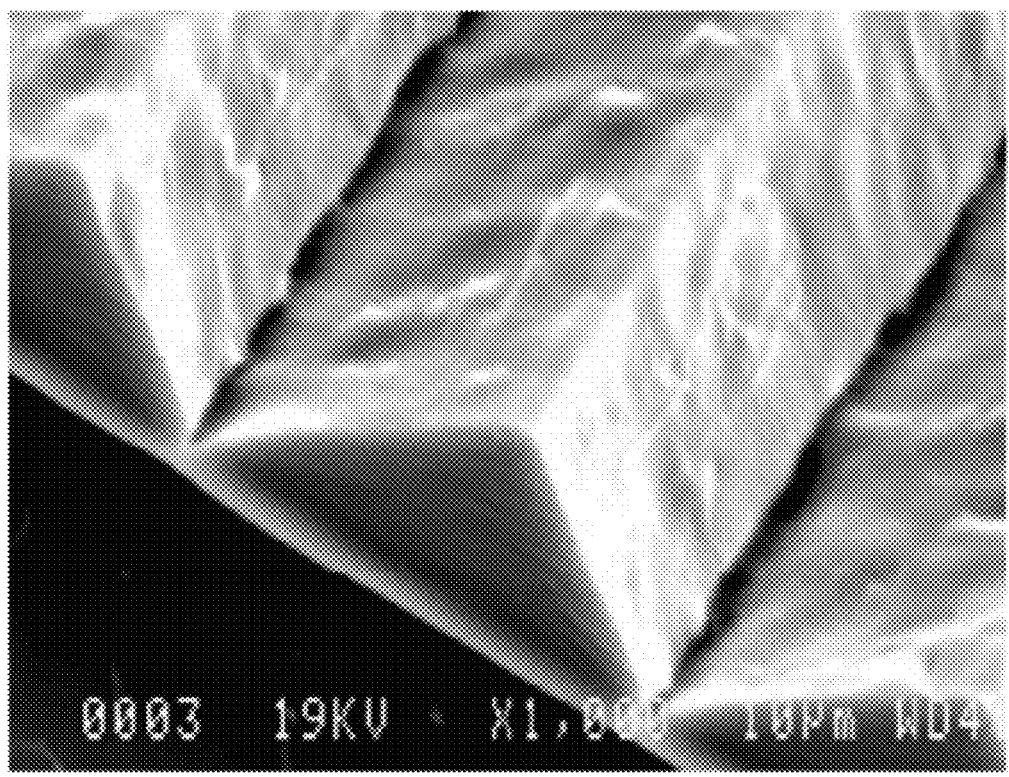
FIGS. 4 and 5 illustrate enlarged views of the electron micrograph of FIG. 3.
Figure 5:
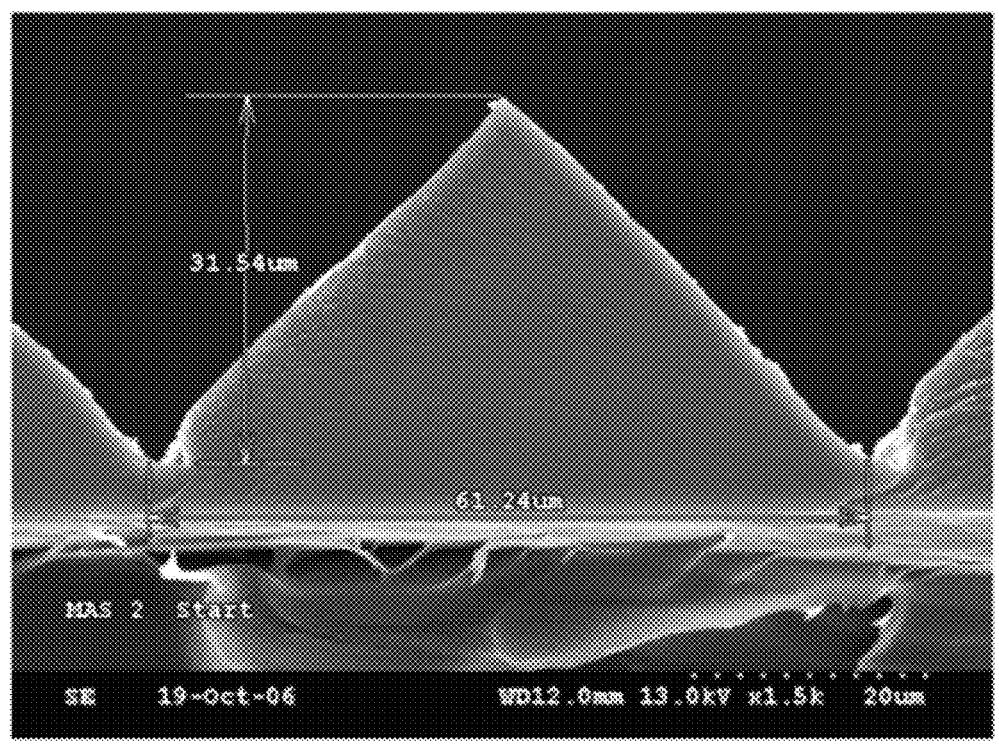

FIG. 2 illustrates a schematic perspective view of an optical sheet according to an embodiment. FIG. 3 illustrates an electron micrograph of an optical sheet according to an embodiment, and FIGS. 4 and 5 illustrate enlarged views of the electron micrograph of FIG. 3.

Referring to FIG. 2, an optical prism sheet 20 may include a base film 200, an optical refracting part 210, and an optical diffusing part having fine irregularities, the fine irregularities being intentionally formed on the optical refracting part 210. The fine irregularities may be, e.g., a minute concave-convex structure or pattern. The optical prism sheet 20 may be used to both refract and diffuse light, so that an LCD backlight unit may exhibit excellent transmittance and diffusion. Furthermore, the optical prism sheet 20 may permit the elimination of a separate diffuser sheet, i.e., the optical prism sheet 20 may replace both the prism sheet 125 and the diffuser sheet 120. Thus, it may be possible to reduce manufacturing costs and to decrease the thickness of the LCD backlight unit and, thus, an LCD.

The base film 200 may constitute a base layer of the optical prism sheet 20, and may include a transparent material, e.g., a transparent synthetic resin, glass, a transparent metallic material such as a metal oxide, etc. The transparent synthetic resin may include one or more of, e.g., polyethylene, polypropylene, polycarbonate, polymethylmethacrylate (PMMA), and the like. The base film 200 may have a thickness of, e.g., a μm scale.

The optical refracting part 210 may be formed on one side of the base film 200. The optical refracting part 210 may refract light that passed through the base film 200 and may give the light a specific orientation.

As shown in FIG. 2, the optical refracting part 210 may have unit prisms 211 thereon, which may be densely arranged with a specific orientation on one side of the base film 200. Thus, the optical refracting part 210 may be formed by a plurality of unit prisms 211, which may be arranged on one side of the base film 200. Light passing through the base film 200 may be refracted and oriented in a specific direction by the unit prisms 211.

Figure 6:
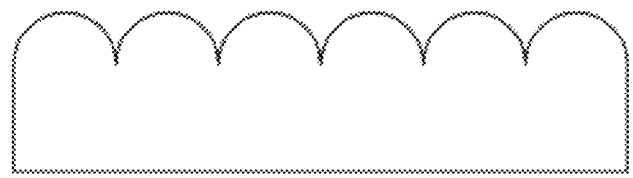
FIG. 6 (a)~(d) illustrate cross-sections of unit prisms according to an embodiment.
Figure 6:
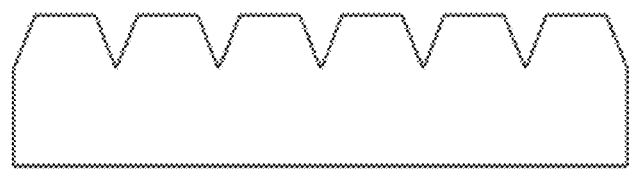
Figure 6:
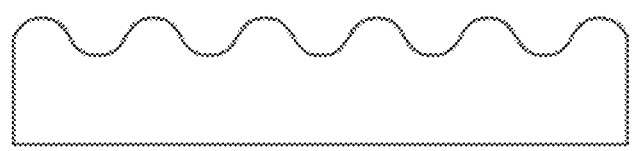
Figure 6:
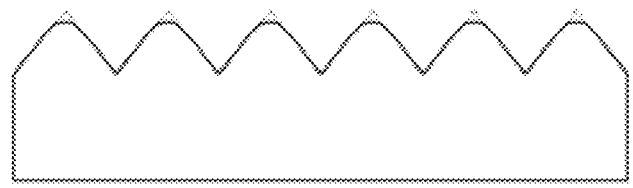

Referring to FIG. 2, the optical refracting part 210 may include a plurality of unit prisms 211 having a triangular cross-section and shaped overall like a triangular prism. The cross-section of the unit prisms 211 of the optical refracting part 210 may be triangular or some other shape, e.g., a semi-circular shape (i.e., a semi-cylinder or lenticular shape), a trapezoidal shape, a rounded wedge shape, or another suitable shape for refracting light. FIG. 6 (a) illustrates cross-section of unit prism having a semi-circular shape. FIG. 6 (b) illustrates cross-section of unit prism having a trapezoidal shape. FIG. 6 (c) illustrates cross-section of unit prism having a rounded shape. FIG. 6 (d) illustrates a triangular cross-section of a unit prism wherein an outer surface around a vertical angle of the unit prism is rounded.

The cross-sectional shape and dimensions of the unit prisms 211 employed in the optical prism sheet 20 may be determined according to one or more of practical device properties, e.g., required viewing angles, screen size, etc.

In an implementation, the unit prisms 211 included in the optical refracting part 210 may be arranged closely, with no space between adjacent unit prisms 211. In another implementation, if collimation is more important than refraction, the unit prisms 211 may be spaced apart from each other, such that a flat surface is present between adjacent unit prisms 211. In another implementation, the unit prisms 211 may be arranged in a combination of the above, i.e., including unit prisms 211 arranged closely with no space between some adjacent unit prisms 211 and including some unit prisms 211 arranged with a flat surface between adjacent unit prisms 211.

Figure 7:
FIG. 7 (a)~(c) illustrate cross-sections of unit prisms with flat spaces therebetween according to an embodiment.
Figure 7:
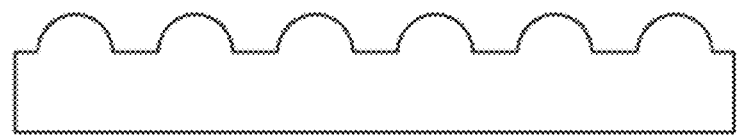
Figure 7:
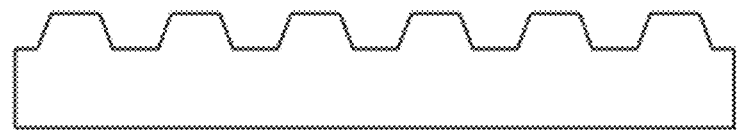

For prisms that have no space between them, the pitch may be equal to the width of a unit prism 211, while, for unit prisms 211 with a flat space therebetween, the pitch may be equal to the width of a unit prism 211 plus the width of an adjacent flat space. FIG. 7 (a) illustrates unit prism having a triangular cross-section with flat spaces therebetween. FIG. 7 (b) illustrates unit prism having a semi-circular cross-section with flat spaces therebetween. FIG. 7 (c) illustrates unit prism having a trapezoidal cross-section with flat spaces therebetween.

The height may be, e.g., about 2 μm to about 100 μm. The height may be a mean value if all prism heights are not the same. The pitch may be, e.g., about 5 μm to about 300 μm. In an implementation, the pitch may be about 10 μm to about 200 μm. In an alternative implementation, the pitch may be about 2 μm to about 100 μm.

In the case that the unit prisms 211 have a triangular cross-section, a vertical angle (θ) of the unit prism 211 may be about 30° to about 120°. The vertical angle (θ) refers to an internal angle at the peak of the unit prism 211, i.e., the angle under the ridgeline.

In an implementation, an outer surface of the peak, i.e., around the vertical angle, of the unit prisms 211 may be rounded to prevent scratches when another film is stacked on and contacts the unit prism 211. Thus, an uppermost surface of the unit prism 211 may be in the form of a rounded edge.

The optical diffusing part of the optical prism sheet 20 may slightly diffuse light that has passed through the base film 200 and the optical refracting part 210 at the surface of the optical refracting part 210. The optical diffusing part of the optical prism sheet 20 may diffuse the light while keeping a decrease in brightness of the refracted light to less than about 5% to about 10%.

The optical diffusing part may a regular or irregular pattern. The regular or irregular pattern may be formed by arranging minute concave-convex structures on the surface of the unit prisms 211 of the optical refracting part 210. The optical diffusing part having such fine irregularities may include a plurality of lens-shaped concave and convex patterns, each having a rounded surface, covering the surface of the optical refracting part 210. The fine irregularities on the optical diffusing part may be arranged closely together, e.g., touching, or spaced apart from each other at a predetermined distance.

A surface roughness (Ra) of the optical diffusing part may be smaller than the height of the unit prisms 211 of the optical refracting part 210. The optical diffusing part may have a Ra of, e.g., about 0.05 μm to about 30 μm. In an implementation, Ra may be about 0.1 μm to about 10 μm. Ra may be determined in accordance with an overall size of the unit prisms 211. For example, a larger Ra may be used where the unit prism 211 is larger.

Maintaining a Ra of about 0.05 μm to about 30 μm may help maintain frontal brightness (i.e., brightness of light directed to the panel) in the refracted light. Diffusion may decrease if the Ra is smaller than about 0.05 μm. If the Ra is larger than about 30 μm, the diffusion may be enhanced but the frontal brightness may decrease.

The fine irregularities formed on the optical refracting part 210 may increase a unit surface area of the optical refracting part 210 (as compared to the optical refracting part 210 having only the unit prisms without fine irregularities) by about 1.1 to about 100 times. For example, the fine irregularities formed on the unit prisms 211 may increase a unit surface area of the unit prisms 211 (as compared to unit prisms 211 without fine irregularities) by about 1.1 to about 100 times. In an implementation, the fine irregularities may be formed to increase the unit surface area of the optical refracting part (as compared to the optical refracting part 210 having only the unit prisms without fine irregularities) by about 1.5 to about 20 times.

The optical diffusing part may be formed by a separate process on the optical refracting part 210. In another implementation, the optical diffusing part may be formed at the same time and integral with the optical refracting part 210, i.e., the optical diffusing part and the optical refracting part 210 may be integrally formed together as a single body, and may be formed of a same material.

The optical refracting part 210 may be manufactured by, e.g., pressing a transparent film having a predetermined thickness with a prism-engraved mold, so that the transparent film is formed to have a prism-embossed pattern corresponding to the prism-engraved mold. The top of the transparent film may become the optical refracting part having unit prisms 211, and the bottom may become the base film 200. Thus, the base film 200, the unit prisms 211, and the optical diffusing part (fine irregularities) may all be formed of a single, integral material.

The optical refracting part 210 and the optical diffusing part may be formed at the same time during the process of manufacturing the optical prism sheet 20. In an implementation, the fine irregularities, e.g., concave and convex patterns (which may be irregular patterns, or a regular pattern such as an array), of the optical diffusing part may be formed in the prism-engraved mold. Furthermore, the pressing of the transparent film having a predetermined thickness may be performed with this mold having the fine irregularities. Thereby, the optical refracting part 210 and the optical diffusing part may be integrally formed with each other.

The optical prism sheet 20 including the base 200, optical refracting part 210, and the optical diffusing part may be stacked on a light-exit surface of the light guide plate 112 in the backlight unit. The optical prism sheet 20 may be used with or without the separate diffuser plate 120.

The optical prism sheet 20 shown in FIGS. 3, 4, and 5 was manufactured using the process discussed above, and was photographed using an electron microscope. Referring to FIGS. 3, 4, and 5, the prism-shaped optical refracting part 210 having unit prisms 211 is formed on the film having a predetermined thickness, and the surface of the optical diffusing part is not smooth, but is instead rough with a concave-convex structure. This concave-convex structure corresponds to the optical diffusing part.

As described above, the optical refracting part 210 and the unit prisms 211 may be formed on the base film 200. Furthermore, the optical diffusing part, e.g., a minute concave-convex structure, may be formed to facilitate light diffusion on the surface of the prism-containing optical refracting part 210. The optical refracting part 210 may have a polygonal cross-section, such as that provided by a linear array of triangular-cross-section unit prisms 211. Further, the height and pitch of the unit prisms 211 may be sized in relation to the mean roughness Ra of the fine irregularities of the optical diffusing part. Also, the height and pitch of the unit prisms 211 may be sized in relation to the unit surface area of the unit prisms 211.

In an implementation, the optical sheet 20 may be employed in an edge-type backlight unit, where the light source is located at a lateral side of the light guide plate 112. In another implementation, the optical sheet 20 may be employed in a direct-type backlight unit, where the light source is located directly at the rear of the light guide plate. Further, the optical sheet 20 may be used with various kinds of light sources, e.g., a cold cathode fluorescence lamp (CCFL), a light emitting diode (LED), etc., that are suitable for use in the light unit.

The following Example and Comparative Example are provided in order to set forth particular details of one or more embodiments. However, it will be understood that the embodiments are not limited to the particular details described. Further, details that are readily apparent to those skilled in the art may be omitted, for clarity.

As shown by the Example and Comparative Example, transmittance and haze value (the haze value indicating a degree of light diffusion) are superior in the Example, without a significant decrease in brightness.

A first Example was manufactured with an optical refracting part having unit prisms with a vertical angle of 90° and a height of 31.54 μm and a pitch of about 61.24 μm. The first Example had fine irregularities in the form of a concave-convex structure having a mean surface roughness of about 2 μm on the surface of the optical refracting part.

A Comparative Example was manufactured with an optical refracting part having a vertical angle of 90° and a height of 31.54 μm and a pitch of about 61.24 μm, and without the fine irregularities.

The Example and Comparative Example were compared using the same physical values of the base film, i.e., same material type, material transmittance, material haze value, material thickness, etc., of the base film. Surface brightness, haze, and transmittance were then measured for samples manufactured as described for the Example and Comparative Example.

The following Table 1 shows brightness, haze, and transmittance of samples manufactured by the foregoing first Example and Comparative Example.

TABLE 1

|  | Comparative Example | First Example |
| --- | --- | --- |
| Brightness (cd/m$^2$) | 6557 | 6066 |
| Haze (%) | 85.87 | 92.70 |
| Transmittance (%) | 6.24 | 33.99 |

The sample according to the Comparative Example had a high center brightness and poor light diffusion. Specifically, as shown in Table 1, the sample based on the Comparative Example showed a center brightness of about 6,557 cd/m2, a haze of about 85.87%, and a transmittance of about 6.24%.

The sample based on the first Example had a similar center brightness to the Comparative Example, while also exhibiting superior light diffusion compared to the Comparative Example. Specifically, as shown in Table 1, the sample based on the first Example had a center brightness of about 6,066 cd/m$^2$, a haze of about 92.70%, and a transmittance of about 33.99%.

As described above, the optical sheet according to an embodiment may provide excellent light diffusion and transmittance, while having a center brightness decrease of less than about 5% to about 10%.

In accordance with an exemplary embodiment, the optical prism sheet 20 may include the optical refracting part 210 having a plurality of unit prisms 211 with a predetermined cross-section on one side of the optical prism sheet, and fine irregularities having a predetermined roughness that are capable of diffusing light on a surface of the optical refracting part 210. A unit surface area of the optical refracting part having the fine irregularities may be about 1.1 to about 100 times that of an optical refracting part having unit prisms without the fine irregularities. The unit surface area of the optical refracting part having the fine irregularities may be about 1.5 to about 20 times that of the optical refracting part having the unit prisms without the fine irregularities.

A LCD backlight unit according to an embodiment, and an LCD including the same, may include a light guide plate 112, a light source 105 located at a lateral or rear side of the light guide plate 112, and the optical prism sheet 20 disposed on a light-exit side of the light guide plate 112, the optical prism sheet 20 being configured to both refract and diffuse light.

As described above, embodiments include an optical prism sheet including an optical refracting part having a predetermined roughness thereon, which may be used to refract light emitted from a light guide plate in a predetermined direction while also diffusing the light. The optical prism sheet may be used for, e.g., a backlight unit, which itself may be used to provide illumination to a liquid crystal display panel in a liquid crystal display. The optical prism sheet may efficiently and uniformly diffuse light throughout a whole area of a large-scale panel. A separate base film or similar separate layer for diffusing light may not be needed in manufacturing a backlight unit, as the structure of a diffuser plate and prism sheet may be integrated into a single layer.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An optical prism sheet, comprising:
   an optical refracting part including a plurality of prisms, the prisms each having a predetermined cross-section and being disposed on one side of the optical prism sheet, and the prisms having a height of about 2 μm to about 100 μm; and
   fine irregularities having a predetermined roughness and configured to diffuse light, the fine irregularities being on surfaces of the prisms and increasing a unit surface area of the optical refracting part by about 1.1 to about 100 times,
   wherein the fine irregularities provide the optical refracting part with a mean roughness of about 0.05 μm to about 30 μm, and the prisms have a pitch of about 5 μm to about 300 μm.

2. The optical prism sheet as claimed in claim 1, wherein the fine irregularities increase the unit surface area of the optical refracting part about 1.5 to about 20 times.

3. The optical prism sheet as claimed in claim 1, wherein the mean roughness of the fine irregularities is about 0.1 μm to about 10 μm.

4. The optical prism sheet as claimed in claim 1, wherein the prisms have cross-sections that include at least one of a triangular shape, a semicircular shape, a trapezoidal shape, and a rounded wedge shape.

5. The optical prism sheet as claimed in claim 1, wherein:
the prisms have a triangular cross-section, and
an internal angle at the peak of the triangular cross-section is about 30° to about 120°.

6. The optical prism sheet as claimed in claim 5, wherein an outer surface around the peak is rounded.

7. The optical prism sheet as claimed in claim 1, wherein the pitch of the prisms is about 10 µm to about 200 µm.

8. The optical prism sheet as claimed in claim 1, wherein the optical sheet includes a base film, and the optical refracting part made of a same material.

9. The optical prism sheet as claimed in claim 8, wherein the base film includes at least one of a transparent synthetic resin, a glass, and a transparent metal oxide.

10. The optical prism sheet as claimed in claim 9, wherein:
the base film includes the transparent synthetic resin, and
the transparent synthetic resin includes at least one of polyethylene, polypropylene, polycarbonate, and polymethylmethacrylate (PMMA).

11. The optical prism sheet as claimed in claim 8, wherein the base film, the optical refracting part, and the fine irregularities are integrally formed.

12. A backlight unit, comprising:
a light guide plate;
a light source providing light to a lateral or rear side of the light guide plate; and
an optical prism sheet disposed at a light-exit side of the light guide plate, the optical prism sheet including:
an optical refracting part including a plurality of prisms, the prisms each having a predetermined cross-section and being disposed on one side of the optical prism sheet, and the prisms having a height of about 2 µm to about 100 µm; and
fine irregularities having a predetermined roughness and configured to diffuse light, the fine irregularities being on surfaces of the prisms and increasing a unit surface area of the optical refracting part by about 1.1 to about 100 times,
wherein the fine irregularities provide the optical refracting part with a mean roughness of about 0.05 µm to about 30 µm, and the prisms have a pitch of about 5 µm to about 300 µm.

13. A liquid crystal display, comprising:
a liquid crystal display panel;
a light source;
a light guide plate disposed in an optical path between the light source and the liquid crystal display panel; and
an optical prism sheet disposed in the optical path between the light guide plate and the liquid crystal display panel, the optical prism sheet including:
an optical refracting part including a plurality of prisms, the prisms each having a predetermined cross-section and being disposed on one side of the optical prism sheet, and the prisms having a height of about 2 µm to about 100 µm; and
fine irregularities having a predetermined roughness and configured to diffuse light, the fine irregularities being on surfaces of the prisms and increasing a unit surface area of the optical refracting part by about 1.1 to about 100 times,
wherein the fine irregularities provide the optical refracting part with a mean roughness of about 0.05 µm to about 30 µm, and the prisms have a pitch of about 5 µm to about 300 µm.

* * * * *